US011232274B2

(12) United States Patent
Hansen et al.

(10) Patent No.: US 11,232,274 B2
(45) Date of Patent: Jan. 25, 2022

(54) SUPPRESSING IMPAIRMENT DATA IN FINGERPRINT IMAGES (71) Applicant: Fingerprint Cards AB, Gothenburg (SE)

(72) Inventors: Morten Hansen, Hellerup (DK); Michael Sass Hansen, København S (DK); Arne Husth, Hellerup (DK)

(73) Assignee: FINGERPRINT CARDS ANACATUM IP AB, Gothenburg (SE)

( * ) Notice: Subject to any disclaimer, the term of this patent is extended or adjusted under 35 U.S.C. 154(b) by 38 days.

(21) Appl. No.: 16/491,668

(22) PCT Filed: Mar. 5, 2018

(86) PCT No.: PCT/SE2018/050205
§ 371 (c)(1),
(2) Date: Sep. 6, 2019

(87) PCT Pub. No.: WO2018/164625
PCT Pub. Date: Sep. 13, 2018

(65) Prior Publication Data
US 2021/0097248 A1    Apr. 1, 2021

(30) Foreign Application Priority Data
Mar. 10, 2017  (SE) .................... 1750270-9

(51) Int. Cl.
*G06K 9/00*       (2006.01)
*G06F 21/32*      (2013.01)
(52) U.S. Cl.
CPC ........... *G06K 9/0002* (2013.01); *G06F 21/32* (2013.01)

(58) Field of Classification Search
CPC .... G06K 9/0002; G06K 9/00067; G06K 9/40; G06F 21/32; G06T 5/00
See application file for complete search history.

(56) References Cited

U.S. PATENT DOCUMENTS

| 6,330,345 B1 * | 12/2001 | Russo ................. G06K 9/0002 348/218.1 |
| 6,535,622 B1 | 3/2003 | Russo et al. |
| 2001/0040987 A1 | 11/2001 | Bjorn et al. |
| 2002/0181749 A1 | 12/2002 | Matsumoto et al. |
| 2003/0068073 A1 | 4/2003 | Wirtz |
| 2006/0285728 A1 | 12/2006 | Leung et al. |

(Continued)

FOREIGN PATENT DOCUMENTS

| CN | 105956535 A | 9/2016 |
| CN | 106164933 A | 11/2016 |

OTHER PUBLICATIONS

PCT International Search Report and Written Opinion dated May 22, 2018 for International Application No. PCT/SE2018/050205, 9 pages.

(Continued)

*Primary Examiner* — Edward F Urban
*Assistant Examiner* — Wassim Mahrouka
(74) *Attorney, Agent, or Firm* — RMCK Law Group, PLC (57) ABSTRACT The invention relates to a method of a fingerprint sensing system of enabling suppressing impairment data present in an image captured by a fingerprint sensor of the fingerprint sensing system, and a fingerprint sensing system performing the method.

10 Claims, 9 Drawing Sheets (56) References Cited

U.S. PATENT DOCUMENTS

| | | |
|---|---|---|
| 2008/0205714 A1 | 8/2008 | Benkley et al. |
| 2012/0014570 A1* | 1/2012 | Abe .................. G06K 9/00067 |
| | | 382/124 |
| 2015/0071502 A1* | 3/2015 | Breznicky .......... G06K 9/00885 |
| | | 382/115 |
| 2016/0012271 A1* | 1/2016 | Hansen .............. G06K 9/00087 |
| | | 382/124 |
| 2017/0032165 A1 | 2/2017 | Hansen et al. |
| 2017/0169271 A1* | 6/2017 | Setterberg .............. G06K 9/036 |

OTHER PUBLICATIONS

Partial Supplementary European Search Report dated Dec. 18, 2020 for EP Application No. 18763369.8, 14 pages.

* cited by examiner

SUPPRESSING IMPAIRMENT DATA IN FINGERPRINT IMAGES

CROSS-REFERENCE TO RELATED APPLICATIONS

This application is a 371 U.S. National Stage of International Application No. PCT/SE2018/050205, filed Mar. 5, 2018, which claims priority to Swedish Patent Application No. 1750270-9, filed Mar. 10, 2017. The disclosures of each of the above applications are incorporated herein by reference in their entirety.

TECHNICAL FIELD

The invention relates to a method of a fingerprint sensing system of suppressing impairment data present in an image captured by a fingerprint sensor of the fingerprint sensing system, and a fingerprint sensing system performing the method.

BACKGROUND

Electronic devices such as smart phones, laptops, remote controls, tablets, smart cards, etc., may use fingerprint recognition e.g. to allow a user to access the device, to authorize transactions carried out using the electronic device, or to authorize the user for accessing a service via the electronic device.

Hence, the electronic device, being for example a smart phone, is equipped with a fingerprint sensor on which the user places her finger in order for the sensor to capture an image of the fingerprint and compare the recorded fingerprint with a pre-stored, authenticated fingerprint template. If the recorded fingerprint matches the pre-stored template, the user is authenticated and the smart phone will perform an appropriate action, such as transitioning from locked mode to unlocked mode, in which the user is allowed access to the smart phone.

For a fingerprint sensor—being based on e.g. a capacitive, optical or an ultra sonic detection signal from the finger—requirements on the materials present between the user's finger and the fingerprint sensing elements (known as pixels) of the sensor are high in terms of precision in thickness and material properties such as for instance dielectric homogeneity for capacitive sensors. In case of a capacitive sensor, when the user touches a fingerprint sensing area (covered by e.g. glass or ceramic) of the smart phone, a capacitor is formed between a surface of the fingerprint sensing area and the fingerprint sensor arranged inside the smart phone. By measuring the capacitance between the surface touched by the user and the sensor at each pixel, the fingerprint of the user may be derived from an image captured by the fingerprint sensor of the user's finger.

However, due to a number of reasons, impairment data in the form of quasi-stationary noise may be present in the image captured by the fingerprint sensor which renders the deriving of a fingerprint from a captured image more difficult.

For capacitive sensors, this type of noise is referred to as capacitive noise and may occur for instance due to impairments such as variations in the material stack-up height between the surface of the fingerprint sensing area and the fingerprint sensor, a damaged surface of the fingerprint sensing area in the form of for instance scratches, or due to impairments such as sensor warpage or imperfections in material properties, such as impurities in the material adhesive between the stack-up and the sensing area. and give rise to a recurring noise pattern in captured images. In order to eliminate capacitive noise, sub-µm precision and extremely pure materials may be required. In a practical scenario, such precision in materials is difficult to achieve.

SUMMARY

An object of the present invention is to solve, or at least mitigate, this problem in the art and thus to provide an improved method of at least partly suppressing impairment data present in images captured by the fingerprint sensor.

This object is attained in a first aspect of the invention by a method of a fingerprint sensing system of suppressing impairment data present in an image captured by a fingerprint sensor of the fingerprint sensing system. The method comprises capturing at least one image of an object contacting the fingerprint sensor, the image comprising impairment data caused by impairments that the fingerprint sensor is subjected to, storing the captured image comprising the impairment data, capturing at least one further image of a fingerprint of a finger contacting the fingerprint sensor, and processing the further captured image of a fingerprint with the stored captured image comprising the impairment data in order to at least partly suppress the impairment data in said further captured image of a fingerprint.

This object is attained in a second aspect of the invention by a method of a fingerprint sensing system comprising a fingerprint sensor and a processing unit. The fingerprint sensing system is configured to suppress impairment data present in an image captured by the fingerprint sensor of the fingerprint sensing system. The fingerprint sensor is configured to capture at least one image of an object contacting the fingerprint sensor, the image comprising impairment data caused by impairments that the fingerprint sensor is subjected to. The processing unit is configured to store the captured image comprising the impairment data, capture at least one further image of a fingerprint of a finger contacting the fingerprint sensor, and process the further captured image of a fingerprint with the stored captured image comprising the impairment data in order to at least partly suppress the impairment data in said further captured image of a fingerprint.

As previously discussed, impairment data in the form of quasi-stationary noise may be present in the image captured by the fingerprint sensor which renders the deriving of a fingerprint from a captured image more difficult.

The invention advantageously suppresses such impairment data present in captured images by having a fingerprint sensor capturing an image of an object contacting the sensor. The object may be an artificial finger in the form of a so called rubber stamp, or a real finger of a user. In the following, the object will be exemplified by a user's real finger.

It is noted that several images are likely to be captured, and that these images are combined to produce a single image representing the impairment data.

Subsequently, when user of an electronic device in which the fingerprint system is arranged wishes to perform an authentication process with the electronic device—being e.g. a smart phone—for instance by pressing her thumb to a home button of the smart phone under which the fingerprint sensor is arranged for unlocking the smart phone, the fingerprint sensor captures a further image of the fingerprint of the user.

The previously stored image comprising the impairment data is fetched from a memory, and the processing unit processes the captured image of the fingerprint with the stored captured image of the rubber stamp comprising the impairment data in order to suppress or even cancel out the impairment data from the further captured image.

Advantageously, the impairment data present in the further captured image images is suppressed, while the fingerprint is intact.

In an embodiment a rubber stamp is used for creating and storing the single image comprising the impairment data. This may be performed during manufacturing and testing of the fingerprint sensor.

However, in the embodiment where the user's finger is utilized to create the single image comprising the impairment data, a number of advantages are attained.

Firstly, by applying a registration process utilizing the finger of the user, there is no need to perform the "offline" manufacturing test using the rubber stamp; the capturing of the images comprising the impairment data can be performed any time by the user, either upon configuration of the electronic device in which the sensor is arranged, or later.

For instance, it can be envisaged that one or a couple of images are captured each time the user touches a surface of a sensing area of the sensor, for example when the user wishes to unlock the electronic device, being e.g. a smart phone, and when the processing unit of the fingerprint system determines that a sufficient number of images have been captured, the single image is created and stored. Advantageously, the user will not have to engage in a tedious registration process for creating the image comprising the impairment data.

Secondly, the "online" finger registration process advantageously facilitates updating of the stored image. Since the electronic device is subjected to wear—for instance in the form of scratches and cracks in a cover glass covering the sensor—the impairments that the sensor is subjected to may change over time.

This can be overcome by capturing a large set of new images for creating and storing the single image comprising the new impairment data. Alternatively, new images are repeatedly captured during normal user operation of the electronic device, which new images are combined with the stored single image, wherein the stored image changes over time to reflect changing impairments that the sensor is subjected to.

Hence, a great advantage of capturing images of the user's finger during normal operation of the electronic device implementing the fingerprint sensing system is that estimation of the impairment data can be gradually improved over time (if any refinements are possible). Furthermore, an added benefit of such an approach is that impairments changing over time (i.e. that the user breaks the cover glass of her smart phone) can be compensated for.

Further, in an embodiment, it may be envisaged that a confidence metric associated with the image pixels is computed and utilized for the stored single image. If the stored image is not considered reliable enough in certain areas, i.e. the confidence metric is low for certain areas; those areas are not used when suppressing the impairment data of a further captured image. The confidence metric may be computed on a pixel-by-pixel-level or for a cluster of pixels. It can also be envisaged that an overall confidence metric is computed for the complete stored image.

In still an embodiment, the fingerprint sensing system extracts a fingerprint from the further captured image of a fingerprint in which the impairment data has been suppressed, compares a fingerprint of the captured image of the finger with one or more authorised pre-stored fingerprint templates, and authenticates a user if the extracted fingerprint of the captured image is considered to match one or more of the authorised pre-stored fingerprint templates.

In a further aspect, an electronic device is provided comprising the fingerprint sensing system described herein. The electronic device may be embodied e.g. in the form of a smart phone, laptop, remote control, tablet, smart card, smartwatch, etc., or any other type of present or future similarly configured device utilizing fingerprint sensing.

Further provided is a computer program comprising computer-executable instructions for causing the fingerprint sensing system to perform the described method when the computer-executable instructions are executed on a processing unit included in the fingerprint sensing system.

Yet further provided is a computer program product comprising a computer readable medium, the computer readable medium having the above mentioned computer program embodied thereon.

Further embodiments of the invention will be described in the detailed description.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which:

FIGS. 6(*a*)-(*c*) illustrate images captured by different individuals of fingerprint sensors being subjected to different impairments;

FIGS. 10(*a*)-(*d*) illustrate four captured images comprising impairment data;

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
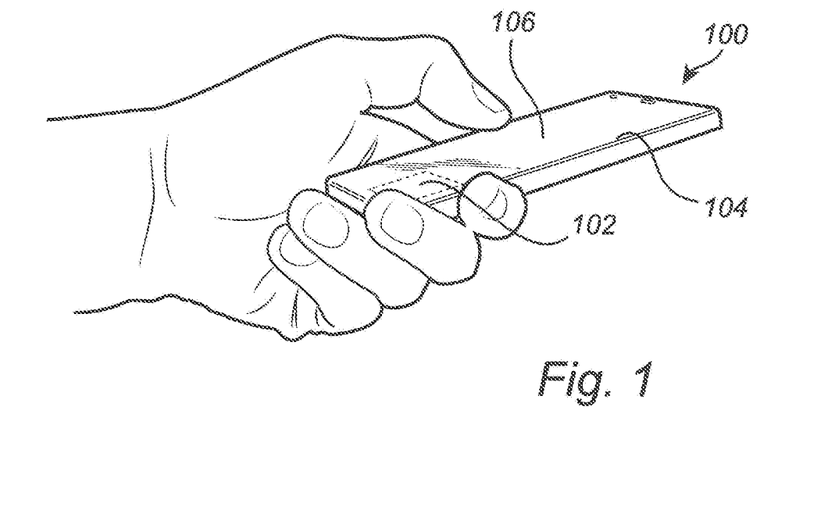
FIG. 1 shows an electronic device in the form of a smart phone in which the present invention may be implemented.

FIG. 1 shows an electronic device in the form of a smart phone 100 in which the present invention may be implemented. The smart phone 100 is equipped with a fingerprint sensor 102 and a display unit 104 with a touch screen interface 106. The fingerprint sensor 102 may, for example, be used for unlocking the mobile phone 100 and/or for authorizing transactions carried out using the mobile phone 100, etc. The fingerprint sensor 102 may alternatively be placed on the backside of the mobile phone 100. It is noted that the fingerprint sensor 102 could be integrated in the display unit/touch screen or form part of a smart phone home button.

It is understood that the fingerprint sensor 102 according to embodiments of the invention may be implemented in other types of electronic devices, such as laptops, remote controls, tablets, smart cards, smartwatches, etc., or any other type of present or future similarly configured device utilizing fingerprint sensing.

Figure 2:
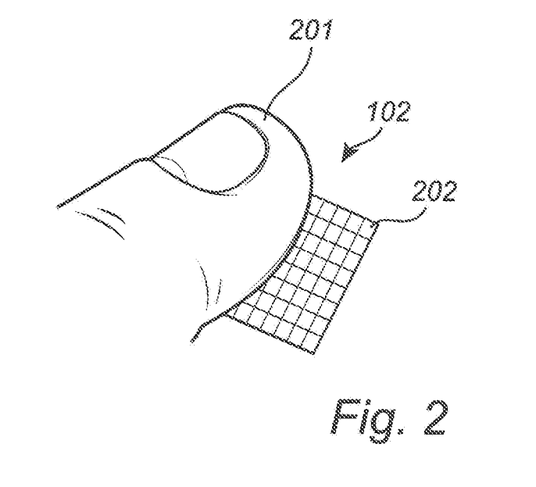
FIG. 2 shows a view of a fingerprint sensor onto which a user places the finger.

FIG. 2 illustrates a somewhat enlarged view of the fingerprint sensor 102 onto which a user places her finger 201. In the case of employing a capacitive sensing technology, the fingerprint sensor 102 is configured to comprise a plurality of sensing elements. A single sensing element (also denoted as a pixel) is in FIG. 2 indicated by reference numeral 202.

It is noted that the present invention is equally applicable to other fingerprint sensing technologies, such as e.g. optical or ultrasonic sensing.

Figure 3:
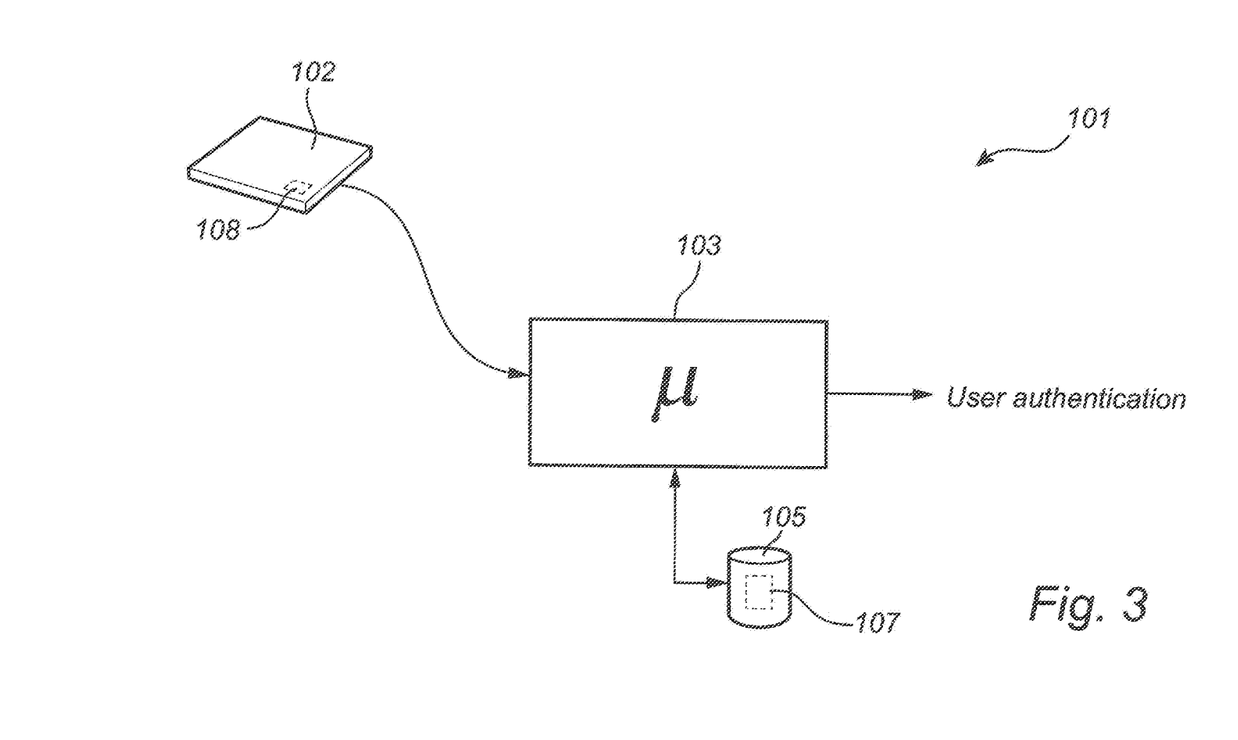
FIG. 3 shows a fingerprint sensor being part of a fingerprint sensing system according to an embodiment.

FIG. 3 shows the fingerprint sensor 102 being part of a fingerprint sensing system 101. The fingerprint sensing system 101 comprises the fingerprint sensor 102 and a processing unit 103, such as a microprocessor, for controlling the fingerprint sensor 102 and for analysing captured fingerprints. The fingerprint sensing system 101 further comprises a memory 105. The fingerprint sensing system 101 in turn, typically, forms part of the electronic device 100 as exemplified in FIG. 1. A local memory 108 such as a one-time programmable (OTP) memory, flash memory, or random access memory (RAM) may be embedded in the sensor die.

Now upon an object contacting the fingerprint sensor 102, the sensor 102 will capture an image of the object in order to have the processing unit 103 determine whether the object is a fingerprint of an authorised user or not by comparing the captured fingerprint to one or more authorised fingerprint templates pre-stored in the memory 105.

The fingerprint sensor 102 may be implemented using any kind of current or future fingerprint sensing principle, including for example capacitive, optical, ultrasonic or thermal sensing technology. Currently, capacitive sensing is most commonly used, in particular in applications where size and power consumption are important. Capacitive fingerprint sensors provide an indicative measure of the capacitance between (see FIG. 2) several sensing elements 202 and a finger 201 placed on the surface of the fingerprint sensor 102. Acquisition of a fingerprint image is typically performed using a fingerprint sensor 102 comprising a plurality of sensing elements 202 arranged in a two-dimensional manner.

In a general authorization process, the user places her finger 201 on the sensor 102 for the sensor to capture an image of the fingerprint of the user. The processing unit 103 evaluates the captured fingerprint and compares it to one or more authenticated fingerprint templates stored in the memory 105. If the recorded fingerprint matches the pre-stored template, the user is authenticated and the processing unit 103 will typically instruct the smart phone 100 to perform an appropriate action, such as transitioning from locked mode to unlocked mode, in which the user is allowed access to the smart phone 100.

With reference again to FIG. 3, the steps of the method performed by the fingerprint sensing system 101 are in practice performed by the processing unit 103 embodied in the form of one or more microprocessors arranged to execute a computer program 107 downloaded to the storage medium 105 associated with the microprocessor, such as a Random Access Memory (RAM), a Flash memory or a hard disk drive. The processing unit 103 is arranged to cause the fingerprint sensing system 101 to carry out the method according to embodiments when the appropriate computer program 107 comprising computer-executable instructions is downloaded to the storage medium 105 and executed by the processing unit 103. The storage medium 105 may also be a computer program product comprising the computer program 107. Alternatively, the computer program 107 may be transferred to the storage medium 105 by means of a suitable computer program product, such as a Digital Versatile Disc (DVD) or a memory stick. As a further alternative, the computer program 107 may be downloaded to the storage medium 105 over a network. The processing unit 103 may alternatively be embodied in the form of a digital signal processor (DSP), an application specific integrated circuit (ASIC), a field-programmable gate array (FPGA), a complex programmable logic device (CPLD), etc. It should further be understood that all or some parts of the functionality provided by means of the processing unit 103 may be at least partly integrated with the fingerprint sensor 102.

Figure 4:
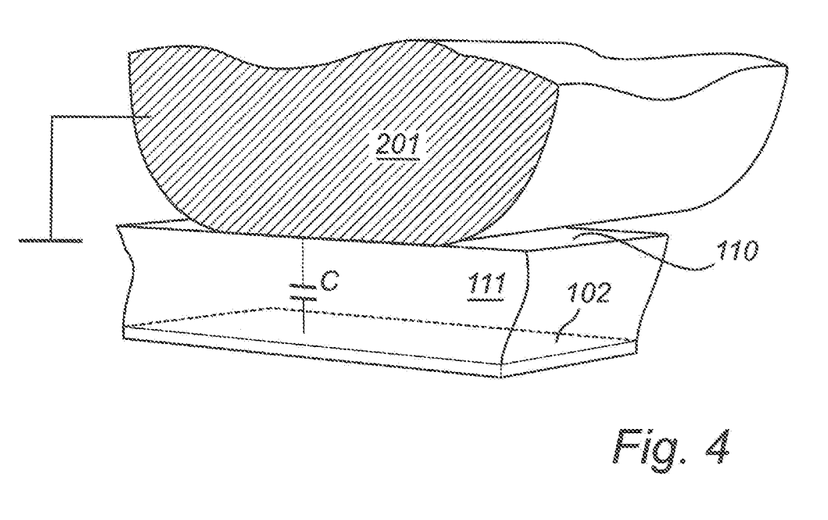
FIG. 4 illustrates the principle for capacitive fingerprint sensing.

FIG. 4 illustrates the principle for capacitive fingerprint sensing, as previously has been discussed. Upon a user contacting a surface 110 of a fingerprint sensing area (typically by touching the home button) of the smart phone with her finger 201, a capacitor C is formed between the surface 110 of the fingerprint sensing area and the fingerprint sensor 102 arranged inside the smart phone. The material in between the surface 110 and the fingerprint sensor 102 may be composed of e.g. glass or ceramic.

By measuring the capacitance between the surface 110 touched by the user and the sensor 102, the fingerprint of the user may be derived from an image captured by the fingerprint sensor 102 of the user's finger 201.

Due to various impairments, such as variations in the stack-up height of the material in between the surface 110 of the fingerprint sensing area and the fingerprint sensor 102, a damaged surface no, sensor warpage, general imperfections in the properties of the material 111 quasi-stationary noise will be present in the images captured by the fingerprint sensor 102 which renders the deriving of a fingerprint from the captured images more difficult. Similar noise is also present in case of using optical or ultrasonic fingerprint sensing technologies.

It is desirable to cancel out such noise—or impairment data—from captured images.

With reference again to FIG. 4, during manufacturing and testing of the fingerprint sensor 102, an object commonly referred to as a (flat) rubber stamp may be applied to the surface no of the fingerprint sensing area of the smart phone instead of a real finger. This rubber stamp typically entirely covers the area no, and correspondingly all pixels of the fingerprint sensor 102. Such a rubber stamp is typically electrically conductive and connected to ground, in order to present an appropriately high capacitance to the sensor 102. Preferably the total capacitance generated by the rubber stamp should be the same as for a typical human finger.

Figure 5:
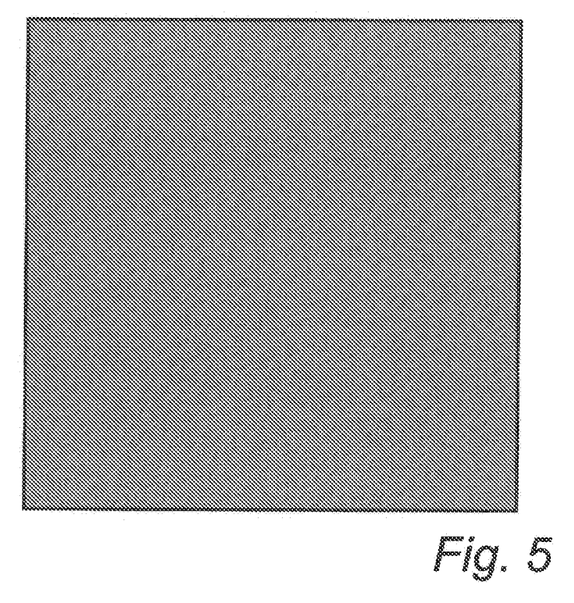
FIG. 5 illustrates an image captured by a fingerprint sensor where the object contacting the sensor is a rubber stamp.

With reference to FIG. 5, for a "perfect" sensor 102, surface no and material in, an image captured by the sensor 102 of such a rubber stamp would be a uniformly black/grey, without any impairment data in the form of artefacts or noise present in the image, whereas in practice where the sensor 102, surface 10 and material 111 are subjected to impairments, impairment data forming some type of pattern is oftentimes present in the captured image.

Figure 6A:
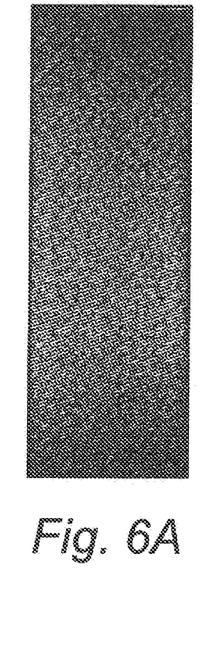
Figure 6B:
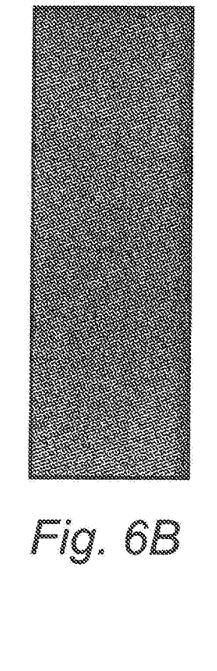
Figure 6C:
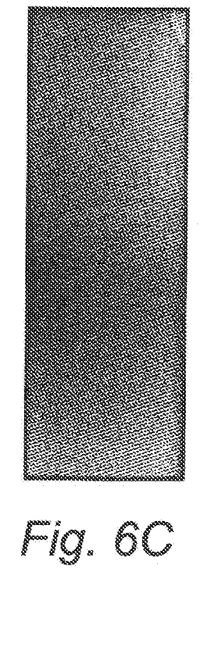

However, in practice, with reference to FIGS. 6(a)-(c), different individuals of fingerprint sensors are subjected to different impairments, which as a result will give different appearances of the captured rubber stamp image.

Figure 7:
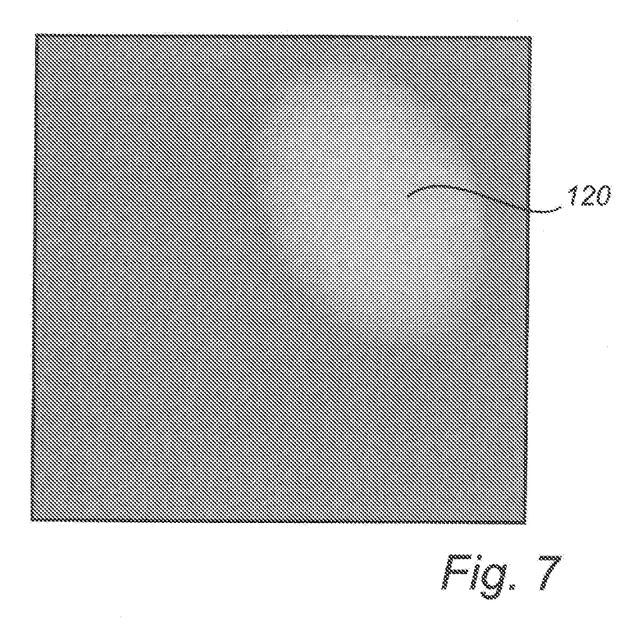
FIG. 7 illustrates the captured image of FIG. 5, but where the image further comprises impairment data.

FIG. 7 illustrates a further example of impairment data 120 present in the captured image in the form of more evident impairment data arranged in a circular or elliptic pattern. This is a pattern which may be the result of an air pocket created in the glass/ceramic material 111 between the surface 110 of the fingerprint sensing area and the fingerprint sensor 102, or by impurities in the glue between the sensor and the cover glass.

No matter the exact appearance of the impairment data present in a captured image, any impairment data will render the extraction of a fingerprint from a captured image more difficult.

Figure 8:
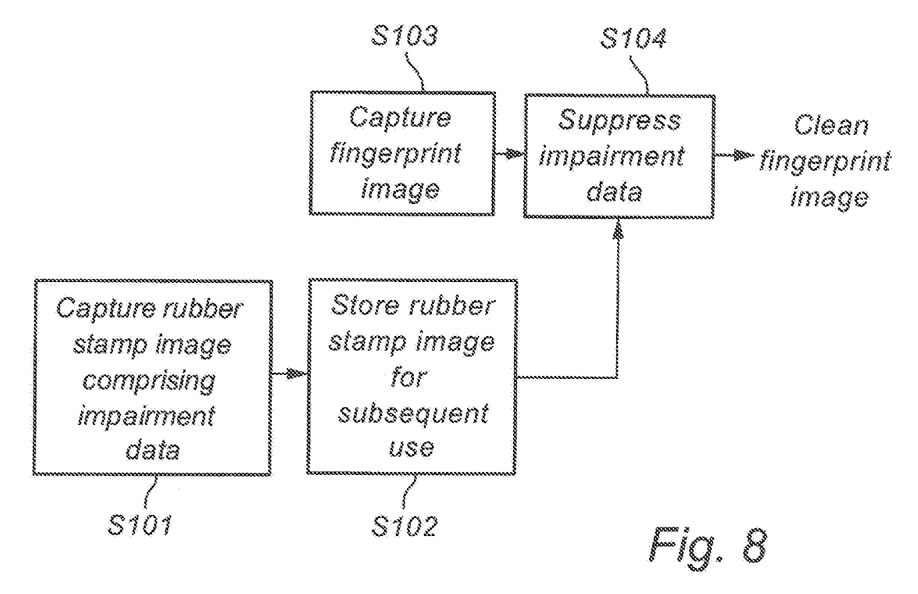
FIG. 8 illustrates a flowchart of the method of suppressing impairment data in a captured image according to an embodiment of the present invention.

FIG. 8 illustrates a flowchart of a method according to an embodiment of the present invention which solves this problem by suppressing impairment data present in a captured image. Reference is further made to the fingerprint sensing system 101 of FIG. 3.

In a first step S101, the fingerprint sensor 102 captures an image of an object contacting the sensor 102. In the following with reference to FIGS. 5 and 7, the object will be exemplified in the form of a rubber stamp, an image of which was illustrated in FIG. 5. It is noted that several images may be captured, and that these images are combined to produce a single image representing the rubber stamp (or the combined result of repeated finger touches). This image may be captured during a manufacturing test of the fingerprint system 101 mounted in an intended electronic device 100, such as a smart phone.

In this exemplifying embodiment, the captured image is assumed to have the appearance shown in FIG. 7, i.e. comprising elliptically-shaped impairment data 120.

Thereafter, in step S102, the captured image(s) comprising the impairment data is stored in the fingerprint system 101, for example in the OTP memory 108 embedded in the sensor die, or in a host memory of the electronic device 100. It is envisaged that the captured image(s) are downsampled or compressed before being stored.

Subsequently, when user of the electronic device 100 in which the fingerprint system 101 is arranged wishes to perform an authentication process with the electronic device being e.g. a smart phone, for instance by pressing her thumb to a home button of the smart phone under which the fingerprint sensor 102 is arranged for unlocking the smart phone 100, the fingerprint sensor 102 captures an image of the fingerprint of the user in step S103.

The previously stored image comprising the impairment data is thus fetched from the OTP memory 108 by the processing unit 103.

Further, in step S104, the processing unit 103 processes the captured image of the fingerprint with the stored captured image of the rubber stamp comprising the impairment data in order to suppress or even cancel out the impairment data from said further captured image.

In an embodiment, the captured fingerprint image is processed using the stored captured image comprising the impairment data 120 in step S104, wherein the impairment data 120 of the previously stored rubber stamp image cancels out the corresponding impairment data which is present in the captured fingerprint image, while the part of the image pertaining to the actual stamp leaves the fingerprint unaffected.

The processing can be performed in many ways; for instance, (a) the stored captured image comprising the impairment data 120 is subtracted from the captured fingerprint image, (b) a linear (or non-linear) combination of the captured fingerprint image and the stored image comprising the impairment data is performed, (c) linear (or non-linear) data fitting of the fingerprint data based on the impairment data, or (d) data modelling of the fingerprint based on the captured image and the stored imaged comprising the impairment data.

Hence, this embodiment advantageously cancels out the impairment data present in the captured image, which greatly helps improve subsequent fingerprint feature extraction from the captured image for matching the captured fingerprint to a pre-stored fingerprint template.

Figure 9:
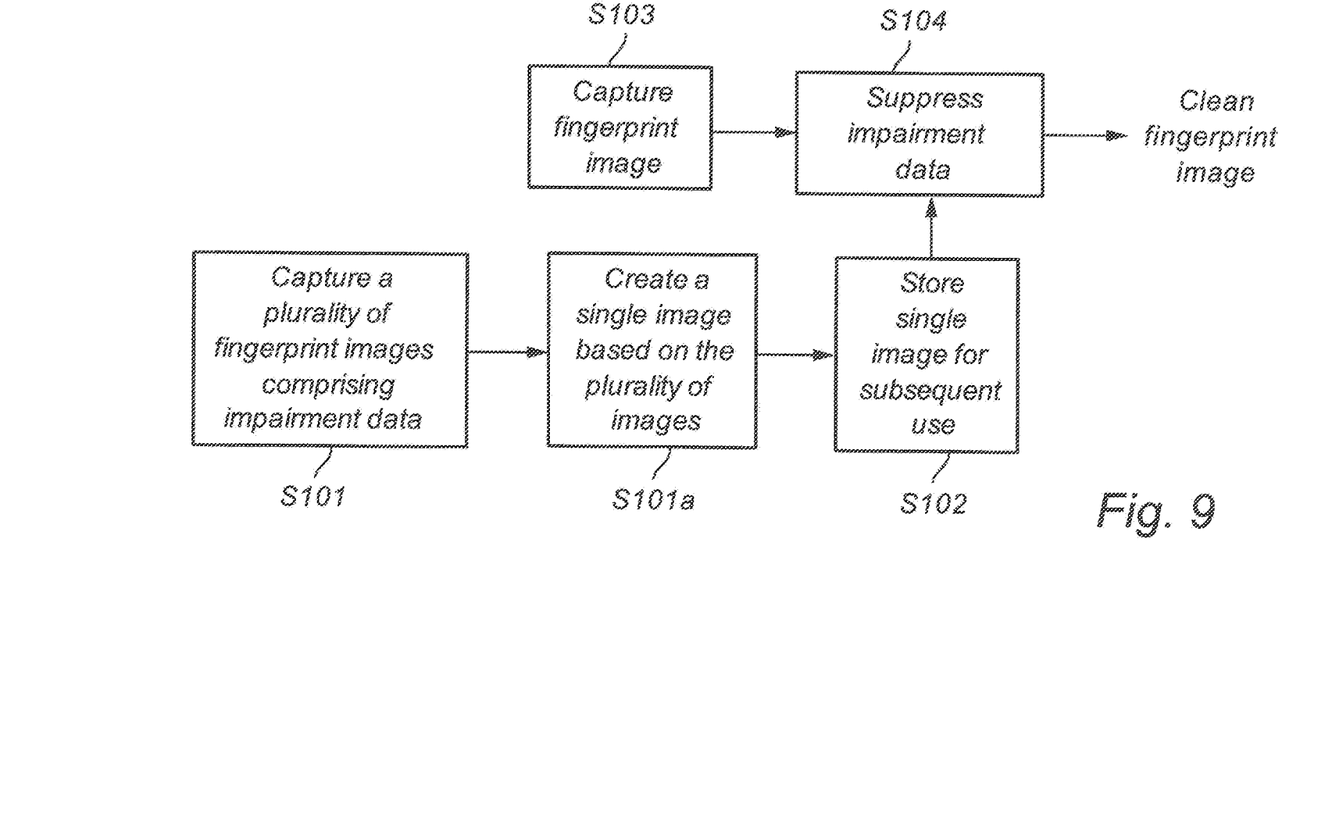
FIG. 9 illustrates a flowchart of the method of suppressing impairment data in a captured image according to another embodiment of the present invention.

FIG. 9 illustrates a flowchart of another method according to an embodiment of the present invention which solves the above given problem by suppressing or even cancelling out impairment data present in a captured image. Reference is further made to the fingerprint sensing system 101 of FIG. 3.

In this particular embodiment, the object used is not a rubber stamp, but an actual finger of the user of the electronic device 100, being e.g. a smart phone.

In a first step S101, the fingerprint sensor 102 captures a plurality of images of the user's finger contacting the sensor 102, four of which are illustrated in FIGS. 10(a)-(d).

As can be seen in FIGS. 10(a)-(d), with respect to the actual fingerprint of the user, no image is likely to be identical to the other, as the user does not press her finger against the surface of the sensing area in the same manner for every captured image. Thus, in the four images illustrated in FIGS. 10(a)-(d), the user's fingerprint is differently positioned, while the impairment data 120 which is caused by the electronic device 100, or the sensor 102 itself, remains constantly positioned in the captured images.

Again with reference to FIG. 9, after the plurality of images of the user's fingerprint has been captured in step S101, a single image is created in step S101a from the plurality of images. In practice, tens of images may be captured, or even up to hundreds.

In an embodiment, the single image is created by combining the plurality of images. For instance, the single image may be created by averaging the plurality of captured fingerprint images.

Figure 11:
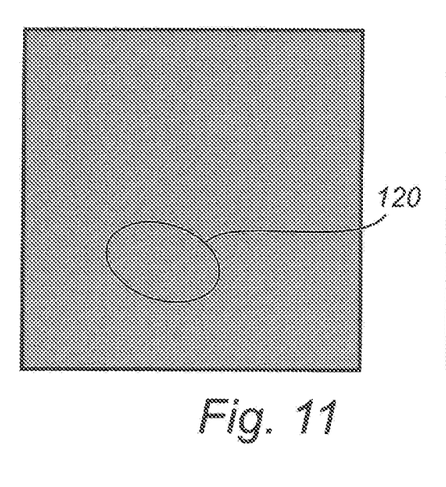
FIG. 11 illustrates the plurality of captured fingerprint images of FIGS. 10(*a*)-(*d*) being combined to create a single image.

FIG. 11 illustrates how the single image would look like when the plurality of captured fingerprint images are averaged to create the single image. As was discussed hereinabove—for the plurality of captured images—the part of each captured image representing the fingerprint will differ from one image to another. The averaging process would thus have a filtering effect on the plurality of images and create an image similar to the rubber stamp image, i.e. an image which is uniformly grey, with the exception of the impairment data 120 which remains constantly positioned throughout the plurality of images. This is important; if the part of the images pertaining to the actual fingerprint of the user is not "blurred out" when creating the single image, there is a risk that impairment data will not be suppressed correctly and that there could even be further impairment data introduced in a subsequently captured fingerprint image.

The created image is then stored in step S103 for subsequent use.

Now, as previously has been discussed, when user of the electronic device 100 in which the fingerprint system 101 is arranged wishes to perform an authentication process with the electronic device 100, the fingerprint sensor 102 captures a further image of the fingerprint of the user in step S103.

The previously stored image comprising the impairment data, which was created from the plurality of captured fingerprint images being combined, is fetched from the OTP memory 108 or from the host memory by the processing unit 103.

Then, in step S104, the processing unit 103 processes the further captured image of the fingerprint with the stored created image comprising the impairment data that will be present in all captured images using this particular electronic device 100, in order to suppress the impairment data in said further captured image.

In this exemplifying embodiment, the processing by the processing unit 103 in step S104 comprises subtracting the captured image comprising the impairment data 120 from the further captured fingerprint image.

Again—since the part of the image pertaining to the actual fingerprint is not a part of the single image representing the impairment data—the impairment data 120 of the previously created and stored fingerprint image cancels out the corresponding impairment data which is present in the captured fingerprint image, while the actual fingerprint in the captured image remains unaffected.

Figure 10A:
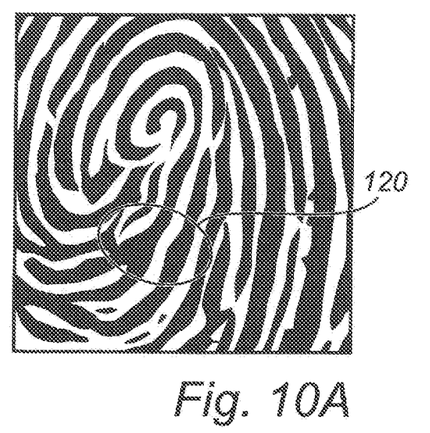
Figure 10B:
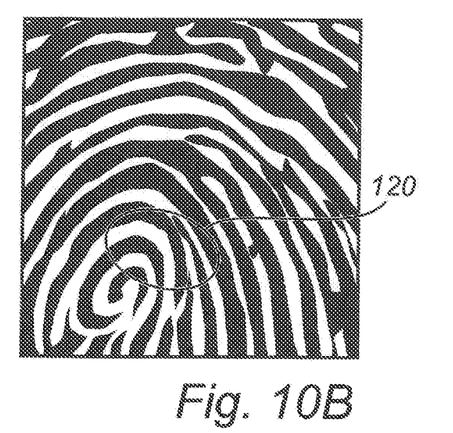
Figure 10C:
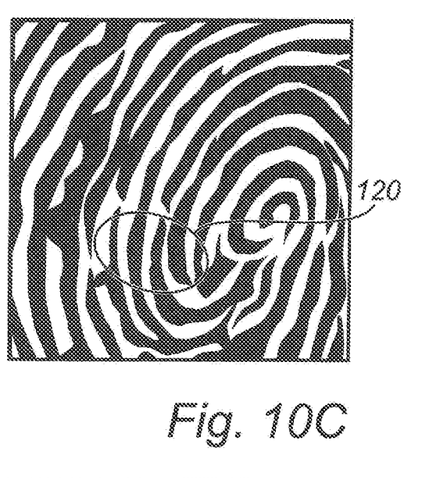
Figure 10D:
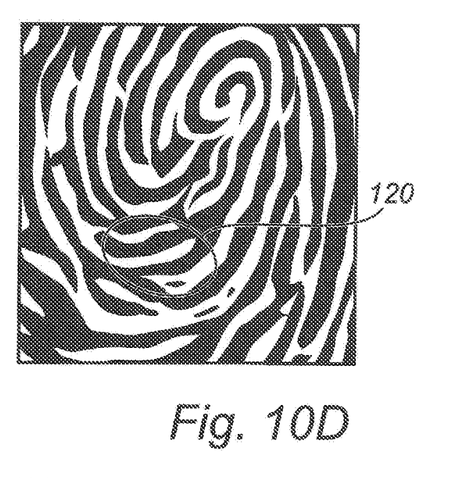
Figure 12:
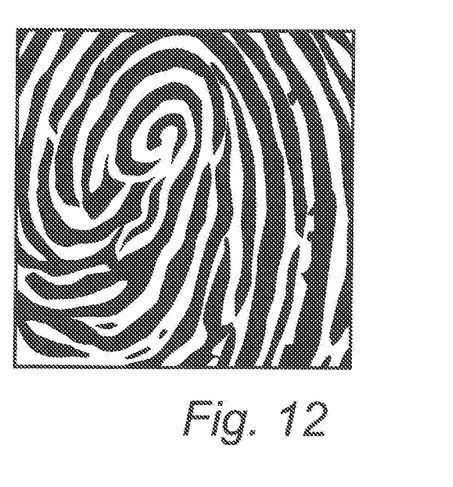
FIG. 12 illustrates the captured fingerprint of FIG. 11, where the impairment data has been cancelled out.

After the stored image of FIG. 11 comprising the impairment data 120 has been subtracted from the captured image for instance having the appearance illustrated in FIG. 10a, a clean fingerprint image is obtained—as illustrated in FIG. 12—where the impairment data 120 advantageously has been completely cancelled out.

This embodiment of utilizing a user's finger for an "online" registration of images in which impairment data is present caused by impairments that the sensor 102 is subjected to has a number of advantages over the previously described "offline" approach using a rubber stamp (or any other test device having an appropriate test pattern being applied to the sensing area of the fingerprint sensor).

Firstly, by using the online finger registration process of FIG. 9, there is no need to perform the offline manufacturing test using the rubber stamp as described with reference to FIG. 8; the capturing of the images comprising the impairment data can be performed any time by the user, either upon configuration of the electronic device 100 in which the sensor 102 is arranged, or later.

For instance, it can be envisaged that one or a couple of images are captured each time the user touches the surface 100 of the sensing area of the sensor 102, for example when the user wishes to unlock the electronic device 100, being e.g. a smart phone, and when the processing unit 103 determines that a sufficient number of images have been captured, the single image is created and stored. Advantageously, the user will not have to engage in a tedious registration process for creating the image comprising the impairment data. In this context, it may be envisaged that the electronic device 100 visually and/or audibly instructs the user how to press her finger against the surface 110 of the sensing area of the fingerprint sensor 102.

Secondly, the online finger registration process advantageously facilitates updating of the stored image. Since the electronic device is subjected to wear—for instance in the form of scratches and cracks in a cover glass covering the sensor 102—the impairments that the sensor 102 is subjected to changes over time.

This can be overcome by capturing a large set of new images for creating and storing the single image comprising the new impairment data. Alternatively, new images are repeatedly captured during normal user operation of the electronic device 100, which new images are combined with—e.g. averaged with—the stored single image, wherein the stored image changes over time to reflect changing impairments that the sensor is subjected to.

Figure 13:
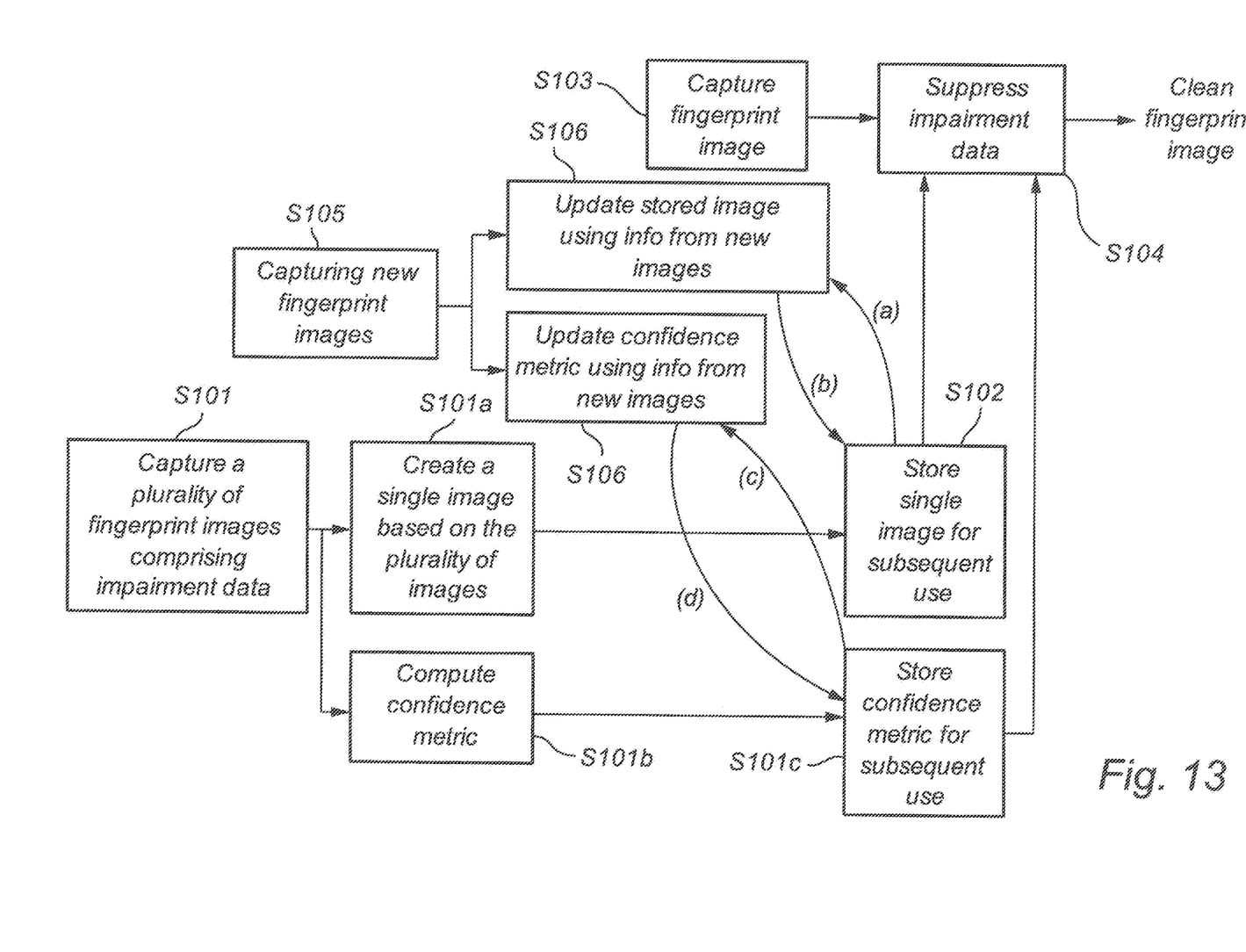
FIG. 13 illustrates a flowchart of the method of enabling suppressing impairment data in a captured image according to another embodiment of the present invention.

FIG. 13 illustrates a flowchart of the method according to this embodiment. Hence, the process of FIG. 9 is performed, and a clean captured image is obtained in step S104.

Now, as the impairments that the fingerprint sensor 102 is subjected to changes, new images of the user's fingerprint are repeatedly captured in step S105, preferably during normal user operation of the electronic device 100.

These new images—or selected information from these images—are then, as indicated with step S106a combined with the stored single image, and the updated single image created by the combining is stored again in step S106b.

Thereafter, the updated single image is used in step S104 for suppressing impairment data in a captured image.

Hence, a great advantage of capturing images of the user's finger during normal operation of the electronic device implementing the fingerprint sensing system is that estimation of the impairment data can be gradually improved over time (if any refinements are possible). Furthermore, an added benefit of such an approach is that impairments changing over time (i.e. that the user damages the glass covering the fingerprint sensor) can be compensated for.

Further, in this and previously described embodiments, it may be envisaged that a confidence metric associated with the image pixels is computed in step S101b and utilized for the stored single image. If the stored image is not considered reliable enough in certain areas as indicated by the confidence metric stored in step S101c, i.e. the confidence metric is low for certain areas; those areas are not used when suppressing the impairment data of a captured image in step S104. The confidence metric may be computed on a pixel-by-pixel-level or for a cluster of pixels. It can also be envisaged that an overall confidence metric is computed for the complete stored image.

If a plurality of new images are captured as indicated by the step S105, these new images—or selected information from these images—are then as indicated with step S106c used to update the stored confidence metric, and the updated confidence metric is stored again in step S106d for subsequent use in the suppression of impairment data of step S104.

Further, in an embodiment, it is envisaged that a small amount of fluid is applied onto the surface of the sensing area 110 of the sensor and/or to the user's finger before an image is captured, in order to further improve the stored image which is used for suppressing impairment data. With the fluid, distinctions between ridges and valleys of the fingerprint is blurred out, while the impairment data remains, which is an advantage for the image which is created and used to suppress impairment data present in a subsequently captured image.

Further, it is envisaged that a user performs a swipe and/or a rotational movement with her finger upon an image being captured; the moving part of the image may thus be identified as the finger while the stationary part of the image is identified as impairment data.

Figure 14:
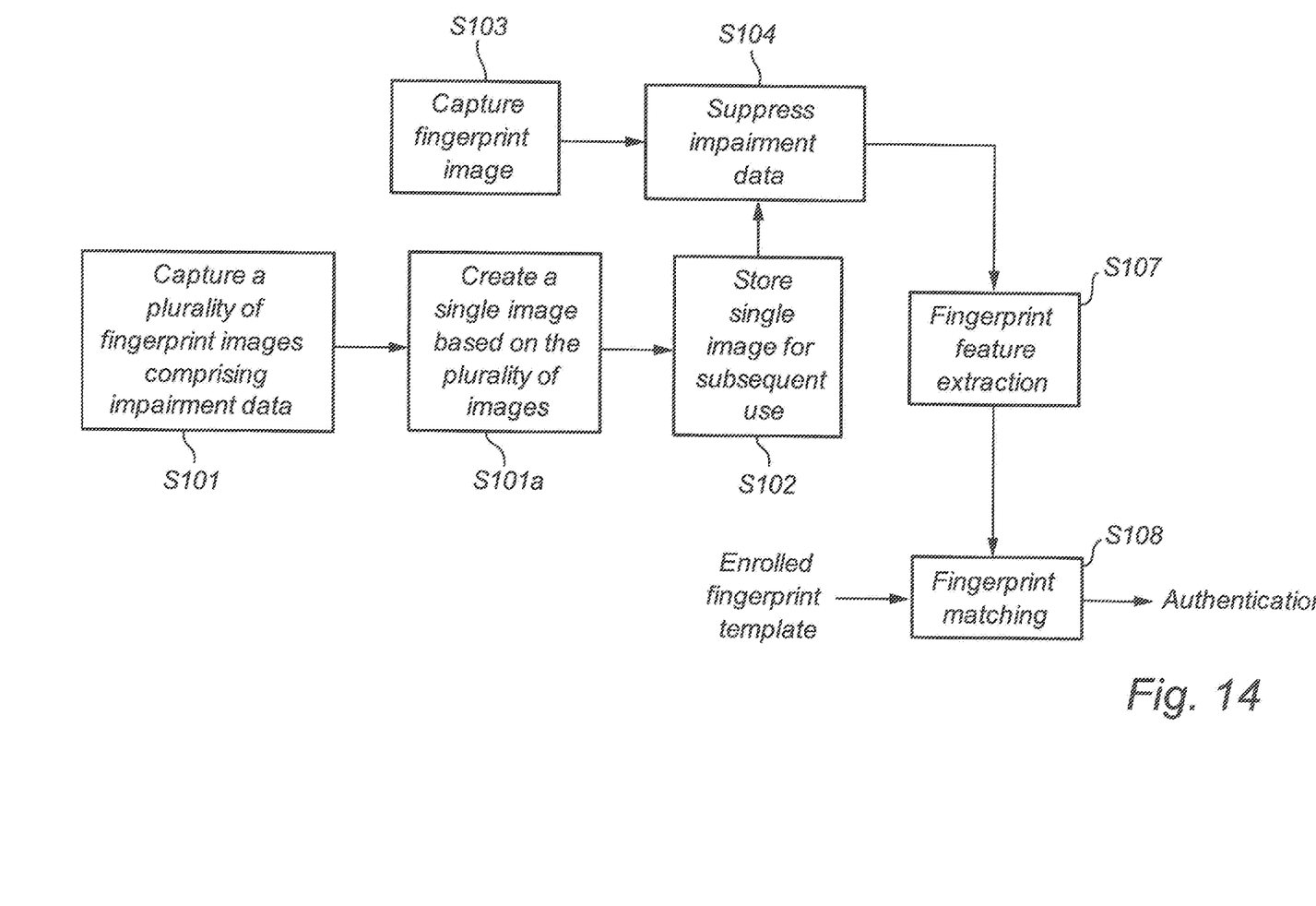
FIG. 14 illustrates a flowchart of the method of enabling suppressing impairment data in a captured image according to yet another embodiment of the present invention.

FIG. 14 illustrates a flowchart where a user is authenticated after the impairment data has been suppressed according to an embodiment of the invention. For a description of the process up until step S104, where the impairment data is cancelled out from the image captured in step S103, reference is made to FIG. 9.

Thus, after a clean image has been achieved in step 104, the processing unit 103 extracts a fingerprint from the enhanced captured image in step S107 and compares it to one or more previously enrolled fingerprint templates stored in the memory 105. If the extracted fingerprint matches the pre-stored template in step S108, the user is authenticated and the processing unit 103 will typically instruct the electronic device 100, being e.g. a smart phone, to perform an appropriate action, such as transitioning from locked mode to unlocked mode, in which the user is allowed access to the smart phone 100.

In an embodiment, the image utilized to suppress impairment data is stored in step S102 in the memory 105 of the fingerprint sensing system 101, which memory is external from the actual sensor 102 (in contrast to the OTP 108 which is on-chip with the sensor 102). Advantageously, besides providing for a greater storage capacity, using the external memory 105 avoids storing the created image in the host device. Further advantageous is that in situations where there is a need to replace the fingerprint sensor 102 with a new sensor, the stored image comprising the impairment data need not be derived again by performing further tests, since the already created image can be acquired from the external memory upon connection of the new sensor to the memory. However, it is also possible that a new image must be captured and stored for the new sensor.

As has been discussed hereinabove, in case the impairment data is of an additive type, the processing unit 103 subtracts a scaled version of the stored image comprising the impairment data from the captured image, wherein the impairment data present in the captured image is suppressed or even cancelled out.

In another embodiment, in case the impairment data is of a multiplicative type, the processing unit 103 divides the impairment data present in the captured image with the impairment data of the single stored image, wherein the impairment data present in the captured image is suppressed or even cancelled out.

It can further be envisaged that the impairment data is both additive and multiplicative.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method of a fingerprint sensing system of suppressing impairment data present in an image captured by a fingerprint sensor of the fingerprint sensing system, comprising:
    capturing a plurality of images of a fingerprint of a finger contacting the fingerprint sensor, the plurality of images comprising impairment data caused by impairments that the fingerprint sensor is subjected to, wherein the plurality of images are captured during normal user operation of an electronic device in which the fingerprint sensing system is arranged;
    creating, from the plurality of captured images of the fingerprint, a composite image comprising the impairment data, wherein one or more images are repeatedly captured upon a user contacting the fingerprint sensor during normal user operation of the electronic device, wherein the composite image created from the plurality of captured images of the fingerprint is created and stored after a sufficient number of images of the fingerprint has been captured;
    storing the composite image comprising the impairment data;
    capturing at least one further image of a fingerprint of a finger contacting the fingerprint sensor;
    processing the further captured image of a fingerprint with the stored composite image comprising the impairment data in order to at least partly suppress the impairment data in said further captured image of a fingerprint;
    repeatedly capturing new images of the fingerprint, the images comprising impairment data;
    creating, from the captured new images and the previously stored composite image comprising the impairment data, an updated image comprising the impairment data; and
    storing the updated image comprising the impairment data, wherein the processing of the further captured image of a fingerprint is performed using the stored updated image comprising the impairment data in order to at least partly suppress the impairment data present in said further captured image of a fingerprint.

2. The method of claim 1, wherein the processing of the further captured image of a fingerprint with the stored composite image comprising the impairment data comprises:
    subtracting the stored composite image comprising the impairment data from the further captured image of a fingerprint.

3. The method of claim 1, wherein the processing of the further captured image of a fingerprint with the stored composite image comprising the impairment data comprises:
    dividing the impairment data present in the further captured image with the impairment data of the stored composite image.

4. The method of claim 1, further comprising:
    applying a small amount of fluid onto the finger of the user, and/or onto a surface of the sensing area of the fingerprint sensor before an image is captured.

5. The method of claim 1, further comprising:
    extracting a fingerprint from said further captured image of a fingerprint in which the impairment data has been suppressed;
    comparing a fingerprint of the captured image of the finger with one or more authorised pre-stored fingerprint templates; and authenticating a user if the extracted fingerprint of the captured image is considered to match one or more of the authorised pre-stored fingerprint templates.

6. The method of claim 1, further comprising:
computing a confidence metric for the stored composite image comprising the impairment data, wherein in case at least a part of the stored composite image is considered to be unreliable as indicated by the computed confidence metric, said part is not utilized for suppressing impairment data present in the further captured image of a fingerprint.

7. The method of claim 6, further comprising:
computing an updated confidence metric based on captured new images of the fingerprint; and
storing the updated confidence metric, wherein the stored updated confidence metric subsequently is taken into account when suppressing impairment data present in the further captured image of a fingerprint.

8. A fingerprint sensing system comprising a fingerprint sensor and a processing unit, the fingerprint sensing system being configured to suppress impairment data present in an image captured by the fingerprint sensor of the fingerprint sensing system,
the fingerprint sensor being configured to:
  capture a plurality of images of a fingerprint of a finger contacting the fingerprint sensor, the plurality of images comprising impairment data caused by impairments that the fingerprint sensor is subjected to, wherein the plurality of images are captured during normal user operation of an electronic device in which the fingerprint sensing system is arranged;
the processing unit being configured to:
  create, from the plurality of captured images of the fingerprint, a composite image comprising the impairment data, wherein one or more images are repeatedly captured upon a user contacting the fingerprint sensor during normal user operation of the electronic device, wherein the composite image created from the plurality of captured images of the fingerprint is created and stored after a sufficient number of images of the fingerprint has been captured;
  store the composite image comprising the impairment data;
  capture at least one further image of a fingerprint of a finger contacting the fingerprint sensor;
  process the further captured image of a fingerprint with the stored composite image comprising the impairment data in order to at least partly suppress the impairment data in said further captured image of a fingerprint;
  repeatedly capture new images of the fingerprint, the images comprising impairment data; and
the processing unit being configured to:
  create, from the captured new images and the previously stored composite image comprising the impairment data, an updated image comprising the impairment data; and
  store the updated image comprising the impairment data, wherein the processing of the further captured image of a fingerprint is performed using the stored updated image comprising the impairment data in order to at least partly suppress the impairment data present in said further captured image of a fingerprint.

9. A computer program product comprising a non-transitory computer readable medium, the computer readable medium having a computer program embodied thereon, the computer program comprising computer-executable instructions for causing a fingerprint sensing system to perform the method of claim 1 when the computer-executable instructions are executed on a processing unit included in the fingerprint sensing system.

10. An electronic device comprising the fingerprint sensing system of claim 8.

* * * * *